United States Patent [19]

Sims

[11] Patent Number: 4,626,849
[45] Date of Patent: Dec. 2, 1986

[54] PROXIMITY DETECTION SYSTEM

[76] Inventor: John C. Sims, 54 Bowditch Rd., Sudbury, Mass. 01776

[21] Appl. No.: 748,694

[22] Filed: Jun. 25, 1985

Related U.S. Application Data

[63] Continuation of Ser. No. 518,451, Jul. 29, 1983, abandoned.

[51] Int. Cl.$^4$ ............................................. G08G 1/00
[52] U.S. Cl. ................................... 340/902; 180/167; 340/901
[58] Field of Search ............................ 340/901–904, 340/961, 51; 180/167, 169, 271; 250/338, 374, 377, 354.1; 343/6.5 LC; 367/118, 124

[56] References Cited

U.S. PATENT DOCUMENTS

| | | | |
|---|---|---|---|
| 3,360,775 | 12/1967 | Schroeder | 340/904 |
| 3,749,918 | 7/1973 | Jones | 340/904 |
| 3,839,717 | 10/1974 | Paul | 340/901 |
| 3,842,397 | 10/1974 | Sindle | 340/904 |
| 3,846,746 | 11/1974 | Trageser | 340/961 |
| 3,854,119 | 12/1974 | Friedman | 340/902 |
| 4,100,529 | 7/1978 | Evans | 340/901 |
| 4,212,085 | 7/1980 | Vaillancour | 340/902 |
| 4,249,160 | 2/1981 | Chilvers | 340/902 |
| 4,317,998 | 3/1982 | Dore | 250/338 |
| 4,349,823 | 9/1982 | Tagami | 340/904 |
| 4,407,388 | 10/1983 | Steel | 180/169 |

OTHER PUBLICATIONS

Johnson, Guy A., "Improved Visibility Systems", Information Circular 8828, *Surface Mine Truck Safety*, 1980.

Primary Examiner—John W. Caldwell, Sr.
Assistant Examiner—Michael F. Heim
Attorney, Agent, or Firm—Robert F. O'Connell

[57] ABSTRACT

A detection system for use in a movable large haulage vehicle operating in a controlled ground environment to prevent collision with other objects in the environment wherein such objects each have a source for omnidirectionally radiating an optical pulsed signal having a selected pulse repetition rate which identifies the object. The vehicle uses detectors mounted at selected locations on the vehicle, which detectors respond to pulsed signals from objects in close proximity to the vehicle. Appropriate circuitry is used to detect the presence of the objects, the ground direction of the objects relative to the vehicle, and the type of objects so detected.

7 Claims, 4 Drawing Figures

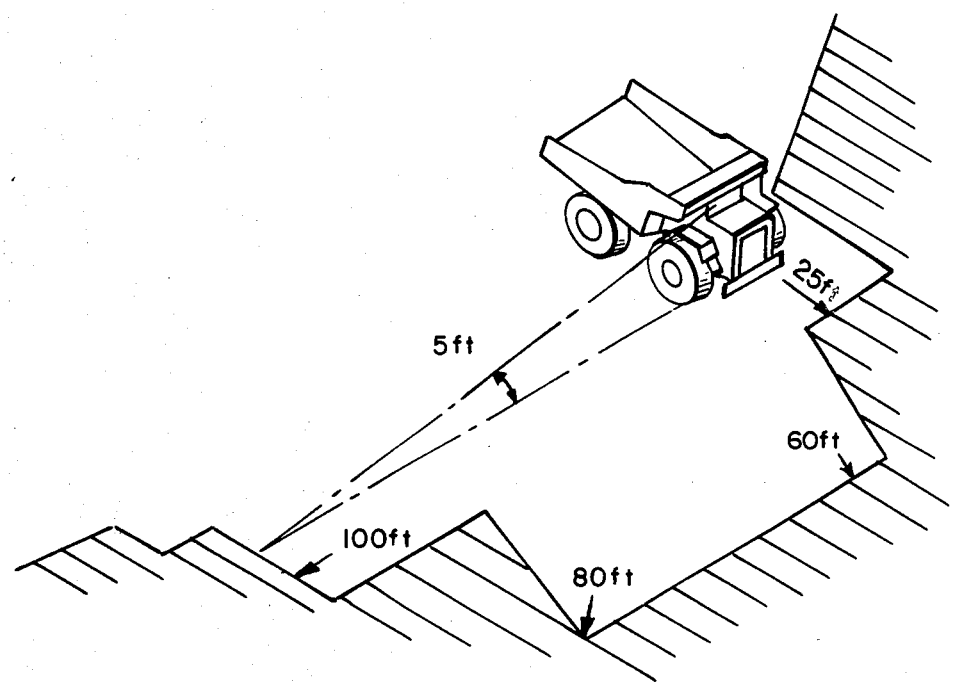
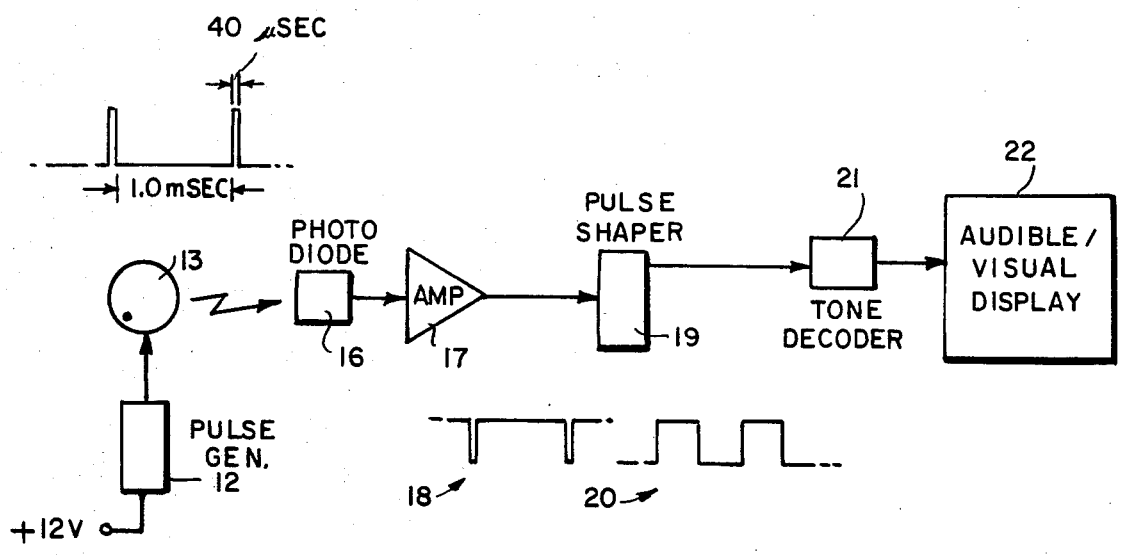
FIG.1
FIG.2

PROXIMITY DETECTION SYSTEM

This application is a continuation of application Ser. No. 518,451 filed 7-29-83 now abandoned.

INTRODUCTION

This invention relates generally to proximity detection systems and, more particularly, to systems for use by large vehicles which have limited visibility, such as used, for example, in mining operations, so that such vehicles can prevent damage to objects which come into their general proximity when the vehicles are in motion.

BACKGROUND OF THE INVENTION

The limited visibility of a driver of a large haulage vehicle, such as may be used in mines or in the construction industry, produces a major safety problem since the lack of visibility causes an increasing number of accidents, particularly as the sizes of such vehicles become larger and larger.

Large, rear dump haulage trucks, for example, have a particular problem because the driver cannot see large areas near the truck, since he normally sits back under the truck box lip for protection from falling objects, and cannot see areas to the rear of the truck. Such blind areas can conceal the presence of people, other vehicles, or various stationary objects, for example, all of which are then subject to potential damage by the large haulage truck. In most such vehicles the visibility problem is greatest for the right front and rear areas, since the driver tends to have better visibility on the left side where he or she normally sits.

Improved driver visibility would considerably reduce accidents and would improve the driver's control of the vehicle and, hence, the productive use of the vehicle. Accordingly, it is desirable that the visibility problem be solved in a manner which provides effective proximity detection of objects in an economically feasible manner.

DESCRIPTION OF THE PRIOR ART

A simple approach to solving such problems is to utilize one or more conventional mirrors suitably placed for the driver's viewing to permit a greater field of view than that provided by the driver's unaided eyes. Such mirrors provide inadequate or no real visibility to the rear of the truck and the vehicles often must be equipped with relatively high pitched pulsating signal generators which serve as an alarm or warning to those at the rear of the truck when the truck is backing up. In order to improve visibility in all of the blind areas, it has been suggested that such mirror systems be made relatively more sophisticated in their structure and operation and that they be supplemented by additional viewing aids. One recently proposed system is described in the article "Improved Visibility Systems" by Guy A. Johnson in "Information Circular 8828", *Surface Mine Truck Safety*, published by the Bureau of Mines, United States Department of the Interior, as part of the proceedings of the Bureau of Mines Technology Transfer Seminars, held on June 25, 1980, July 9, 1980 and July 24, 1980, at Minneapolis, Minn., Birmingham, Ala., and Tuscon, Ariz., respectively, at pages 22–39.

Such article describes a relatively sophisticated mirror type system utilizing Fresnel lens blind area viewers, together with a quick-change left-side mirror, a rectangular convex right-side mirror, and a ruggedized closed-circuit television (CCTV) system mounted at the rear of the vehicle. Major problems with such a system lie in the cost, reliability and maintenance thereof. The mirrors are subject to frequent damage and have to be replaced relatively often, which increases the costs of the system as well as the down-time therefor. Further, the mirrors become coated with dust and other debris (dirt, mud, leaves, etc.) which reduce their visibility so that they must be frequently cleaned. Such problems often cause the system to be essentially unuseable because the visibility has been reduced to such low levels as a result.

Moreover the CCTV system at the rear is costly in itself and can be readily damaged sufficiently to cause it to malfunction, particularly during heavy use, despite its ruggedization. Generally such systems have proved unsatisfactory, particularly in environments such as mining operations, where the above problems tend to be severely aggravated.

It is desirable, therefore, to design a system which is less subject to the disadvantages of a mirror/CCTV system and yet provides sufficient information to the driver so as to prevent damage to nearby objects a reliable manner at reasonable cost.

BRIEF SUMMARY OF THE INVENTION

The system in accordance with the invention is designed for use in a movable vehicle so that the vehicle when moving can prevent damage to other objects, either moving or stationary, which appear in its proximity. In a particular embodiment thereof, each of the objects which may be subject to damage has a means mounted thereon for generating a radiated optical signal which has a selected characteristic. For example, such a signal may comprise a train of pulses having a selected repetition rate, or frequency. The particular rate can be selected to identify the object as a particular type of object. Thus, all automobiles may be identified by a pulse signal of one selected frequency, while all small trucks may be identified by a pulse signal of another selected frequency, and so forth.

The moving vehicle, the visibility of which is to be enhanced, such as a large haulage truck, has mounted at selected locations thereon one or more detection, or sensing, devices which detect or sense pulse signals from the other objects when the other objects are present in the general vicinity of the large vehicle. Such sensors provide a detected signal which can be suitably processed to produce an appropriate audible or visible display so as to alert the driver of the large haulage vehicle to the presence of the object and to the general direction of its location relative to the large haulage vehicle. Such a system, for example, may utilize a tone decoder which responds to the detected signal so as to produce a particular decoded output depending on the frequency of the sensed pulse signal from an object, so as to identify the type of object which is in the vicinity of the large vehicle. The decoded output may also be used to supply a light display (e.g. a light emitting diode display) device for indicating in a visual manner the presence of the object, the type of object, and the general location relative to the large moving vehicle.

DESCRIPTION OF THE INVENTION

The invention can be described in more detail with the help of the accompanying drawings, wherein:

FIG. 1 shows a perspective view of a typical large vehicle having restricted visibility;

FIG. 2 shows a block diagram of a system of the invention having a signal generating means for use with objects and a detection/display means for use with a vehicle of the type shown in FIG. 1;

Figure 3:
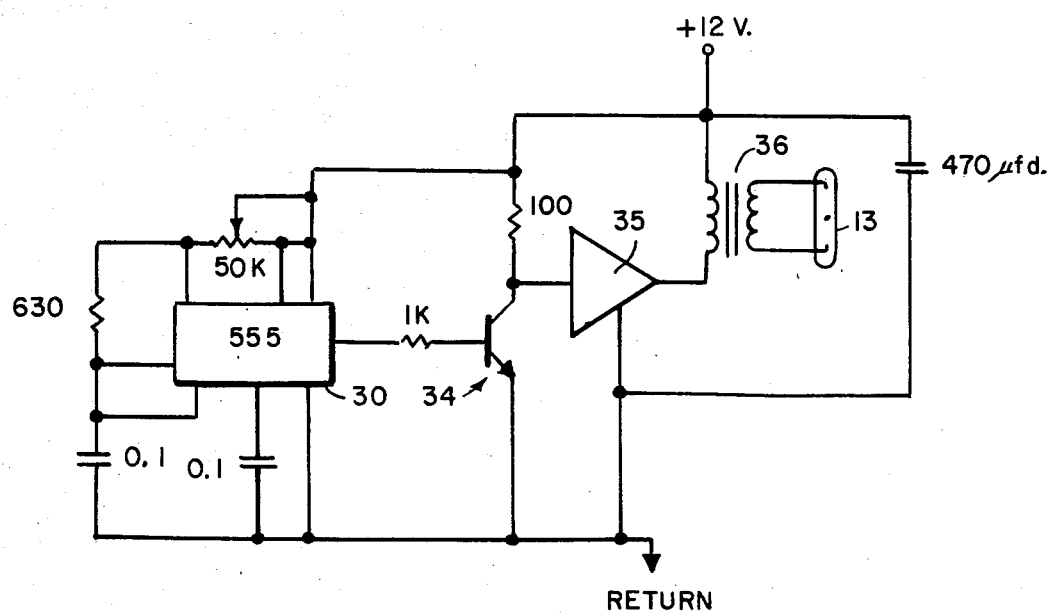
FIG. 3 shows a more detailed circuit diagram of the signal generating means of FIG. 2.

FIG. 1 depicts a large haulage vehicle 10, a typical large haulage vehicle being one of 150 ton size, for example. Because of the configuration and the immense size of such vehicles, the driver has a relatively restricted field of view and, as shown in FIG. 1, the driver may typically be limited in his view generally only to the cross-hatched area in FIG. 1, the remaining area being substantially outside his field of view under normal operating conditions. Thus, the driver normally cannot see large areas near the truck because he is generally set back under the truck lip for protection from falling material, such as rocks, and often also because of auxiliary equipment which is mounted on the radiator deck. Such blind areas can conceal the presence of other objects such as utility vehicles which are used in a mine, pickup trucks, automobiles, people, stationary objects, such as poles, and other road hazards. The visibility problem tends to be the greatest in the right front and in the rear areas of typical such trucks, as seen in FIG. 1.

In order to prevent damage to objects which are present in the proximity of the truck in such restricted areas of vision, the system of the invention utilizes a signal generating means mounted on each object which is likely to come into the restricted vision areas of the truck during operation. The signal generating means 11, as shown in FIG. 2, includes a pulse generator circuit 12 which can be arranged to operate on a 12 volt DC battery such as is available in an automobile or pickup truck, for example. The pulse generator is utilized to excite a gas tube 13 for producing a radiated pulsed output signal having a particular repetition rate, or frequency, as shown by exemplary output signal 14, which signal is thereupon radiated from the gas tube in substantially an omnidirectional manner.

A detection/display means 15 is mounted at one or more selected locations of the large haulage vehicle 10 of FIG. 1, and, as discussed in more detail below, the outputs therefrom can be supplied to a suitable display device which can be placed within the cab of the vehicle so as to provide either an audible or a visual display for the driver thereof. The detection circuitry includes a photodiode 16 which responds to the presence of the output signal from signal generator 11/gas tube 13 to produce an electrical signal which can be amplified by amplifier 17 to provide an amplified detected signal, as shown by detected signal 18, having a frequency or repetition rate which is the same as that of the original signal as radiated from gas tube 13.

Signal 18 is supplied to a suitable pulse shaping circuit 19 to produce therefrom a square-wave signal 20, the frequency of which is related to the repetition rate of the signal 18. Signal 20 is supplied to a suitable tone decoder circuit which produces an output signal which can be used, for example, to provide an audible tone having a particular frequency which is dependent upon the frequency of signal 20. The output of tone decoder can also be supplied to a suitable visual display device, such as a light panel, which can be used to visually indicate to the driver the type of object which is in his vicinity (depending on the frequency of square-wave signal 20) and the general direction of the object relative to his vehicle (depending on which detection means has detected the presence of the output signal from signal generator 11).

Thus signal generators of the type shown by signal generator 11 can be placed on all objects which may come into the vicinity of the vehicle 10, each particular type of object (e.g. an automobile, a pickup truck, etc.) being identified by the frequency of the output signal produced thereby. The detection circuit can be located at one or more positions on the large vehicle, one such detector being utilized, for example, on the roof of the cab positioned so as to be directed toward the front of the truck, another on the right side of the cab and positioned to be directed toward the general right front area of the truck, and another on the rear of the truck positioned to be generally directed toward the rear thereof.

Accordingly, when an object appears in the field of view of a particular detector system, the pulse signal therefrom will be detected by the photodiode 16 and through appropriate processing by amplifier 17, pulse shaper 19 and tone decoder 21 will produce a display signal for audibly or visually informing the driver of the vehicle as to the type of vehicle detected and as to which detector produced the detected signal. The latter information informs the driver of the general direction of the object relative to the vehicle. Any suitable display for providing such information can be used. For example, a display may provide an audible tone, the frequency of which identifies the type of vehicle. Alternatively, a visual light panel, particular lights of which selectively respond to the output of tone decoder 21, can be used to inform the driver as to both the type of vehicle and the particular detector or sensor which has produced the signal. Other displays, whether simple or sophisticated, can be devised by those in the art for such purpose, and need not be described in more detail here. Once the driver is so alerted he can take appropriate action to prevent damage.

A particular circuit for providing the pulse signal from pulse generator 11 (which can be in effect referred to as a "tag" signal) is shown in FIG. 3. A pulse generator for supplying a pulse output signal is shown by pulse generator chip 30 which may be of one type identified as Model No. NE555, made and sold by National Semiconductor Corporation of Santa Clara, Calif. Such chip and its associated circuitry, as shown in FIG. 3, produces a pulse train output signal, the frequency, or pulse repetition rate, thereof being adjusted by variable resistor 31 over a general range for example, from about 500 Hz up to about 3 KHz. The combination of resistance 32 and capacitance 33 can be arranged to provide a selected pulse width. In a typical output signal such pulse width may be selected, for example, as approximately 40 microseconds.

The output of pulse circuit 30 is supplied to a transistor inverter circuit 34 and thence through a power amplifier circuit 35 (e.g. a typical power circuit chip is made and sold as Model No. 5061 by General Electric Corporation). The output therefrom is supplied via transformer 36 to a gas tube 13. The latter tube may be a neon gas tube producing a radiated output in the red or near infrared portion of the spectrum and can be readily fabricated by those in the art, using conventionally known gas tube fabrication techniques, in any selected configuration for such purposes. The output of power amplifier 35 can be set to be in the order of magnitude of about 50 watts so as not to overload the transformer/gas tube circuitry to which it is supplied.

Thus, gas tube 13 then supplies a radiated pulsed output signal at a pulse rate determined by the setting of variable resistor 31, the gas tube being formed, for example, in a generally circular configuration so as to radiate such pulsed signal essentially omnidirectionally.

Figure 4:
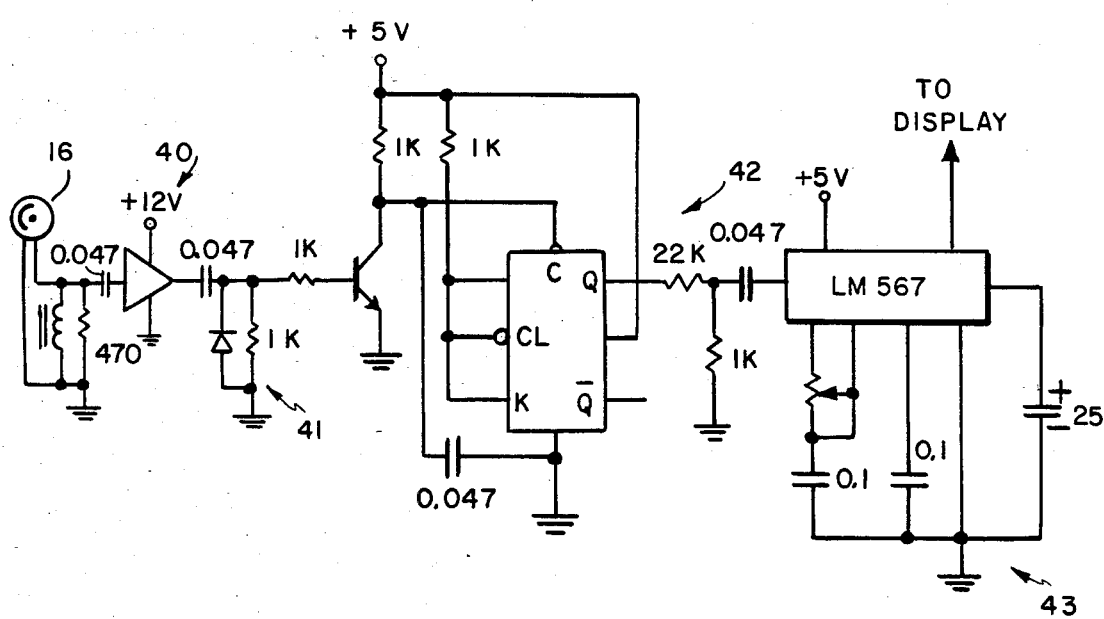
FIG. 4 shows a more detailed circuit diagram of the detection means of FIG. 2.

A particular embodiment of the detector portion of the circuitry of FIG. 2 is shown in FIG. 4. A photocell (photodiode) 16 is supplied to preamplifier circuitry 40, e.g. an operational amplifier (op-amp) made and sold, for example, under the model designation LM352 by National Semiconductor Corporation.

The cone of vision of the photocell 16 may be, for example, approximately 100 degrees, one typical photocell being a silicon photodiode of the type made and sold by Vactech, Incorporated of St. Louis, Mo. The presence, in the proximity of photocell 16, of a pulse signal from the generator of FIG. 3 is detected by photocell 16 when the object on which the pulse generator is mounted thereon is within its cone of vision.

The output of pre-amplifier 40 is supplied to a suitable filter signal conditioning circuit 41 to provide a "clean" pulse signal, i.e. one having reduced noise characteristics. The filtered signal is then supplied to pulse shaping circuitry 42 as shown, utilizing a suitable flip-flop circuit 44 a typical circuit being available as Model No. 7473 made and sold by Texas Instruments Corporation of Dallas, Tex., among others. The function of pulse shaping circuit 42 is to provide a square-wave signal output having a frequency which is specifically related to the frequency of the pulse train signal input thereto. If a pulse signal of 1000 Hz for example, is supplied to circuit 42, a square-wave signal having a frequency of one-half of the pulse frequency (i.e. 500 Hz) is supplied at the output of circuit 42. Such square-wave output signal is supplied to a suitable tone decoder circuit 43, one such circuit being made and sold as Model No. LM567 by National Semiconductor Corporation. Such tone decoding circuitry and the use thereof with a square-wave input is well known to the art. The output of tone decoder circuit 43 is supplied to a suitable display device which in one embodiment may merely be an audio circuit for providing an audible output signal the frequency of which is determined by the frequency of the pulse signal which has been detected by the circuit of FIG. 4. Alternatively, or in conjunction therewith, the signal may be supplied to one of a plurality of visual devices, such as light emitting diodes (LED), which can be arranged to respond to different decoded tone signals depending on the frequency thereof. Such LEDs can be displayed in a suitable panel matrix so as to inform the driver as to which tag signal has been detected (thereby informing him or her of the type of object involved) and as to which detector circuit has responded to the tag signal which has been decoded (thereby giving the driver an indication of the general direction of the sensed signal). Any suitable manner of setting up such displays would be well within the skill of the art and need not be described in more detail.

The system of the invention can be readily fabricated at a reasonable cost and is less subject to damage and to malfunction in a severe environment than are the mirror or mirror/CCTV systems presently used or suggested for such purpose. The tag signal from each object will be generated whether or not the housing within which the circuitry is placed is covered with dust, mud or other debris since, in contrast with signals in the visible range, such signals will normally be transmitted through such materials with little or no alteration. Similarly such signals will be transmitted through the housing which encloses the detection circuitry even when such housing is covered with similar debris. Generally the housing in each case will be a clear plastic material which itself provides little or no attenuation of such signals. While normally the truck operator will wish to keep the housings relatively clean, such is not an absolute necessity if, for example, such cleaning cannot be done too often, and the system will be operable even in the absence of any continuous cleaning schedule. Accordingly, the system can be reliably used in an environment such as a mining operation, construction operation, etc., with little or no problem. The devices involved can be ruggedly made at relatively little cost so that replacement can be kept to a minimum and the system can be utilized for relatively long periods of time without damage. The cost and maintenance thereof will accordingly be advantageous, particularly relative to the somewhat sophisticated and more fragile and less reliable mirror/CCTV sytems utilized at the present time.

The invention is not to be construed as limited to the specific embodiment disclosed above since modifications thereof will occur to those in the art within the spirit and scope of the invention. Hence the invention is not to be construed as limited thereto except as defined by the appended claims.

What is claimed is:

1. A detection system for use in a movable large haulage ground vehicle operating in a controlled ground environment to prevent damage to at least one other object, said system comprising means mounted on said at least one other object present in said environment for omnidirectionally radiating an optical pulsed signal having a selected pulse repetition rate which lies within a frequency range from about 500 Hz to about 3 KHz, the selected pulse repetition rate being used to identify the type of said other object;

optically responsive detection means having a selected field of view mounted at one or more selected locations on said movable vehicle and responsive to said radiated optical pulsed signal when said other object is in the proximity of said movable vehicle within the field of view of said one or more detection means for detecting the presence of said radiated optical pulsed signal so as to provide one or more detected signals; and means responsive to said one or more detected signals for providing an indication to a driver of said movable large haulage vehicle as to the presence of said object in the proximity of the vehicle, as to the general direction of the location of said object relative to the movable vehicle, and as to the type of said object.

2. A detection system in accordance with claim 1 wherein said system is used to prevent damage to a plurality of other objects present in said controlled ground environment and including objects of different types wherein each of said other objects has a said radiating means mounted thereon, the pulse repetition rate of the radiated optical pulse signal at each said object being different for each different type of object on which it is mounted;

each said one or more optically responsive detection means having a different selected field of view, being mounted at one of a plurality of selected locations on said movable large haulage vehicle and responsive over said frequency band to radiated optical pulsed signals from said other objects when said other objects come into the proximity of said movable vehicle for providing said detected signals, said indication providing means being responsive to said detected signals for providing an indication of the presence of said objects, the types of said objects and the general direction of the locations of said objects relative to the movable vehicle.

3. A system in accordance with claim 2 wherein each of said signal radiating means includes a pulse generating means for providing a pulsed electrical signal and a gas tube responsive to said pulsed electrical signal for providing said omnidirectional radiated optical pulsed signal.

4. A system in accordance with claim 3 wherein said gas tube is a neon gas tube.

5. A system in accordance with claim 2 wherein said optically responsive detection means includes photoelectric pulse detection means for providing an electrical signal;

means for amplifying and shaping said electrical signal to provide a square wave signal having a frequency corresponding to the pulse repetition rate of said radiated optical pulsed signal; and decoding means responsive to said square wave signal for providing a decoded signal, the characteristics of which depend upon the frequency of said square wave signal.

6. A system according to claim 5 wherein said photoelectric pulse detection means is a photo cell having a field of view which is represented by a cone of vision of about 100°.

7. A system according to claim 5 wherein said decoding means is a tone decoder.

* * * * *